(12) United States Patent
Hoge

(10) Patent No.: US 6,604,701 B2
(45) Date of Patent: Aug. 12, 2003

(54) SINGLE REEL TAPE CARTRIDGE SLIDING DOOR WITH AUXILIARY LEADER RETRACTOR

(75) Inventor: David T. Hoge, Westminster, CO (US)

(73) Assignee: Quantum, Boulder, CO (US)

( * ) Notice: Subject to any disclaimer, the term of this patent is extended or adjusted under 35 U.S.C. 154(b) by 106 days.

(21) Appl. No.: 09/972,552

(22) Filed: Oct. 5, 2001

(65) Prior Publication Data

US 2003/0066922 A1 Apr. 10, 2003

(51) Int. Cl.[7] ............................................. G11B 23/107
(52) U.S. Cl. ..................... 242/348.2; 360/132
(58) Field of Search ........................ 242/348.2; 360/132

(56) References Cited

U.S. PATENT DOCUMENTS 6,236,539 B1 * 5/2001 Morita et al. ................ 360/132

* cited by examiner

Primary Examiner—John Q. Nguyen
(74) Attorney, Agent, or Firm—Patton Boggs LLP

(57) ABSTRACT

A sliding door assembly for a singe reel tape cartridge for enclosing the tape media and retracting the leader tab when the tape cartridge is not in use. The sliding door assembly includes a sliding door to enclose the tape media, an auxiliary leader retractor to retract the leader tab, and an actuator integrally connected between the sliding door and the auxiliary leader retractor. When the sliding door is moved between the open and closed position it actuates the auxiliary leader retractor that pivots to a corresponding open or closed position.

8 Claims, 5 Drawing Sheets

SINGLE REEL TAPE CARTRIDGE SLIDING DOOR WITH AUXILIARY LEADER RETRACTOR

FIELD OF THE INVENTION

The invention relates to digital tape drives, and in particular, to a sliding door assembly comprising a sliding door that actuates an auxiliary leader retractor for use with a single reel tape cartridge.

PROBLEM

It is a problem in the field of single reel tape cartridges to protect the tape media while the tape cartridge is not in use while also providing a method for exposing the leader tab without requiring excessive area within the tape drive for the door during operation. A second problem is retaining the door assembly within the tape cartridge during operation, thus reducing the storage capacity of the tape cartridge. A third problem is compatibility with existing tape drives.

In the art of data storage, digital data is stored on tape media utilizing a variety of designs, but in all cases, magnetic tape media is wound between a pair of tape reels as data is transferred to or from the tape media. In the art of data storage, the physical space required to store data is an important concern. To conserve space, tape drives often use a single reel tape cartridge design. The single reel design utilizes a supply reel located within the tape cartridge and a take up reel located within the tape drive. A length of magnetic tape media for storing digital data is wound on the supply reel. After the tape cartridge is inserted into the tape drive, the tape media is connected to the takeup reel and wound along a tape path internal to the tape drive.

The single reel tape cartridge design reduces the space previously required in dual reel tape cartridges where the tape traveled between two loosely anchored reels. The space saved in the one reel design where the tape travels between the supply reel in the tape cartridge and a firmly anchored take up reel in the tape drive translates to increased capacity per tape cartridge by providing area for additional tape media. Single reel tape cartridges include a door that opens to expose the tape media leader tab. In its normal position, the flexible leader tab obtrudes from the tape cartridge. The leader tab is retracted into the tape cartridge when the door is closed.

A method for connecting the flexible leader tab to the takeup reel utilizes a leader loading mechanism within the tape drive. As the single reel tape cartridge is inserted into the tape drive the tape cartridge door opens and the flexible leader tab attached to the tape media obtrudes from the tape cartridge. The leader loading mechanism catches the closed loop at the end of the leader tab and pulls the leader tab toward the takeup reel. The leader load mechanism attaches the loop on the end of the leader tab to the takeup reel for operation.

The door performs two functions. First, it protects the tape media when the tape cartridge is not in use. Second, the door opens for operation to make the leader tab available to the leader loading mechanism. The typical solution to the problem has been a door assembly that automatically opens as the tape cartridge is inserted into the tape drive.

Door Retained within Tape Drive During Operation

One known door assembly employs a door that pivots horizontally and includes a catch that corresponds to an indentation in the tape drive. As the tape cartridge is inserted into the tape drive, the catch makes contact with the indentation in the tape drive causing the door to pivot to the open position. Once open, the door remains within the tape drive during operation. As the pivoting door opens, it arcs through approximately a quarter circular profile. The door assembly just described requires internal tape drive space for the door to horizontally pivot between the open and closed position and area for the opened door during operation.

Door Retained within Tape Cartridge During Operation

Another known door assembly incorporates a vertically pivoting door. This design requires additional space within the tape cartridge for the door in its open position. The height of the tape cartridge is dictated by the space required for the magnetic tape and for the opened door. Likewise, the height of the tape drive is influenced by the height of the tape cartridge and the drive mechanism located beneath the inserted tape cartridge.

Another horizontally pivoting door pivots open and is retained in an area behind the tape path, internal to the tape cartridge, during use. The area required within the tape cartridge for the door during operation decreases the area available for tape media, thus reducing the storage capacity of the single reel tape cartridge. The tape cartridge just described requires excessive area within the tape drive for the door assembly to pivot open and uses precious tape cartridge area for the door assembly during operation, thus reducing storage capacity.

The tape cartridge door assemblies just described influence the size of the tape drive. The first horizontally pivoting door influences the tape drives length while the vertically pivoting door influences the tape drive height. Additionally, the horizontally pivoting door that is retained within the tape cartridge during operation uses precious area within the tape cartridge for the door assembly.

Compatibility with Existing Tape Drives

Another problem with single reel tape cartridges is compatibility with existing tape drives. Yet another door assembly utilizes a sliding door, reducing the area required for both opening and retraining the door during use. This design is neither practical for all types of tape cartridge nor compatible with all tape drives. Single reel tape cartridges include a flexible leader tab connected to the end of the tape media within the tape cartridge. The leader tab must be accessible to the leader load mechanism located in the tape drive for operation. Existing tape drives for single reel tape cartridges having a sliding door open the door by sliding the door to the right. The flexible leader tab obtrudes toward the right side of the tape cartridge. The leader load mechanism catches the leader tab, then pulls the leader tab and attached magnetic tape right toward the takeup reel. For compatibility with existing tape drives, the sliding door assembly would have to slide right to open and left to close, catching the leader tab when closing. For the reason just discussed, the sliding door assembly is not compatible with existing single reel tape drives.

The tape cartridges door assemblies just described fail to provide additional area within the tape cartridge for tape media without requiring additional area within the tape drive for the door assembly during operation. The sliding door assembly resolves the problems of retaining the door assembly within the tape drive or the tape cartridge, however, it is not compatible with existing tape drives.

For these reasons, a need exists for a sliding door assembly that does not require additional tape drive area to open the door, or tape cartridge area for the door during operation thus increasing tape cartridge storage capacity and is compatible with an existing tape drive.

SOLUTION

The present sliding door assembly with auxiliary leader retractor overcomes the problems outlined above and advances the art by providing a sliding door assembly that comprises a sliding door and a pivoting auxiliary leader retractor. The sliding door with auxiliary leader retractor does not require additional tape cartridge or tape drive area for the door during operation and is compatible with existing tape drives that accept sliding door tape cartridges. The present sliding door assembly with auxiliary leader retractor overcomes the problems while protecting the tape media when the tape cartridge is not in use and automatically exposing the leader tab for operation.

Tape Drive Area

The sliding door and the auxiliary leader retractor are integrally connected such that, when the sliding door is moved to the open position, the pivoting auxiliary leader retractor pivots open to expose the leader tab. The auxiliary leader retractor is approximately the length of the leader tab it is retracting. Unlike existing tape cartridges having horizontally pivoting door assemblies, when the auxiliary leader retractor pivots open, the door protrudes a minimal distance from the front plane of the tape cartridge. The sliding door with auxiliary leader retractor overcomes the problem of requiring excessive area within the tape drive for the door assembly to pivot open or for retraining the door during operation.

Tape Cartridge Area

The sliding door moves on tracks located on the exterior surface of the tape cartridge housing. The auxiliary leader retractor located adjacent to the sliding door pivots away from the tape cartridge front plane a short distance into the tape drive. To simplify operation of the sliding door with auxiliary leader retractor assembly, an actuation apparatus is integrally connected between the sliding door and the pivoting auxiliary leader retractor, such that when the sliding door is slid open or closed, the pivoting door moves to a corresponding open or closed position. The actuation apparatus is located along the top or the bottom interior surface of the tape cartridge housing. Sliding the door on the exterior surface of the tape cartridge and pivoting the auxiliary leader retractor away from the tape cartridge front plane overcomes the problem of using valuable internal tape cartridge area for the door assembly.

Compatibility with Existing Tape Drives

Existing tape drives for single reel tape cartridges having a sliding door open the door by sliding the door to the right. The present sliding door with auxiliary leader retractor includes a sliding door that slides to the right. Unlike traditional sliding door tape cartridges, the sliding door does not interfere with retraction of the leader tab when the tape cartridge is removed from the tape drive. Instead, as the tape cartridge is removed from the tape drive, an actuator apparatus integrally connected between the sliding door and the auxiliary leader retractor pivots the auxiliary leader retractor closed. Use of a pivoting auxiliary leader retractor overcomes the problem of damaging the leader tab as the sliding door is closed.

The combination of the sliding door to enclose the tape media when the tape cartridge is not in use and the small pivoting auxiliary leader retractor to retract the leader tab eliminates the need to allocated space within the tape drive or the tape cartridge for the door during operation and is compatible with existing single reel tape drives that accept tape cartridges with a sliding door.

DETAILED DESCRIPTION

The present sliding door assembly with auxiliary leader retractor (hereafter referred to as sliding door assembly) summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 1:
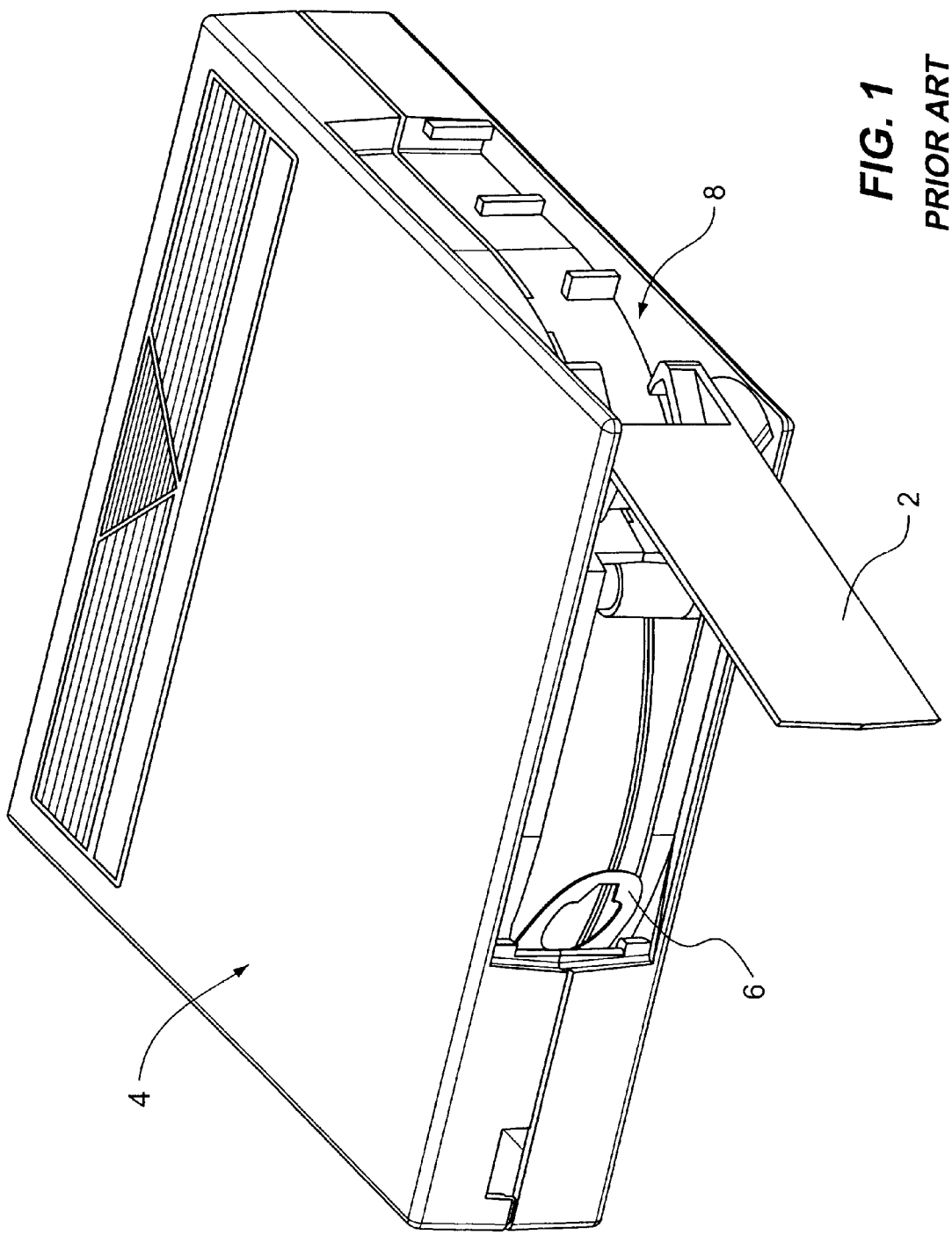
FIG. 1 illustrates a perspective view of a single reel tape cartridge of the prior art.

Prior Art—FIG. 1

The horizontally pivoting door assembly 2 currently used on a DLT style tape cartridge 4 is illustrated in FIG. 1. The pivoting door pivots near the right corner of tape cartridge 4 to allow the pivoting door 2 to open and close. When the tape cartridge is inserted into the tape drive, an indentation located on the interior side of the tape drive catches one end of the pivoting door causing the pivoting door to pivot open. The tape drive area required for the pivoting door to pivot open is approximately a quarter circular area having a radius approximately equal to the length of the pivoting door. When in the open position shown in FIG. 1, leader tab 6 obtrudes from tape cartridge 4.

When the tape cartridge is fully inserted into the tape drive, the open door is either retained internal to the tape drive, or is drawn into the side of the tape cartridge. During use, pivoting door 2 pivots approximately 90 degrees and is drawn along the side of tape cartridge 4 in an area behind the tape path. In one configuration just described, valuable internal tape cartridge space is used for the pivoting door during operation. The alternative configuration retains the pivoting door along the side of the tape drive during operation. While the alternative configuration reduces the area required for the door within the tape cartridge, it increases the area required within the tape drive, thus increasing the length of the tape drive.

Sliding Door Assembly FIGS.—2–4

The sliding door assembly with auxiliary leader retractor provides a means for enclosing the tape media and retracting the leader tab without using valuable space in the tape cartridge or the tape drive for the door assembly when the tape cartridge is in use. The sliding door assembly comprises three components, a sliding door to protect the tape media while the tape cartridge is not in use, an auxiliary leader retractor and an actuation apparatus. The auxiliary leader retractor protects the leader tab when the tape cartridge is not in use and provides a means for exposing the leader tab for operation.

Figure 2:
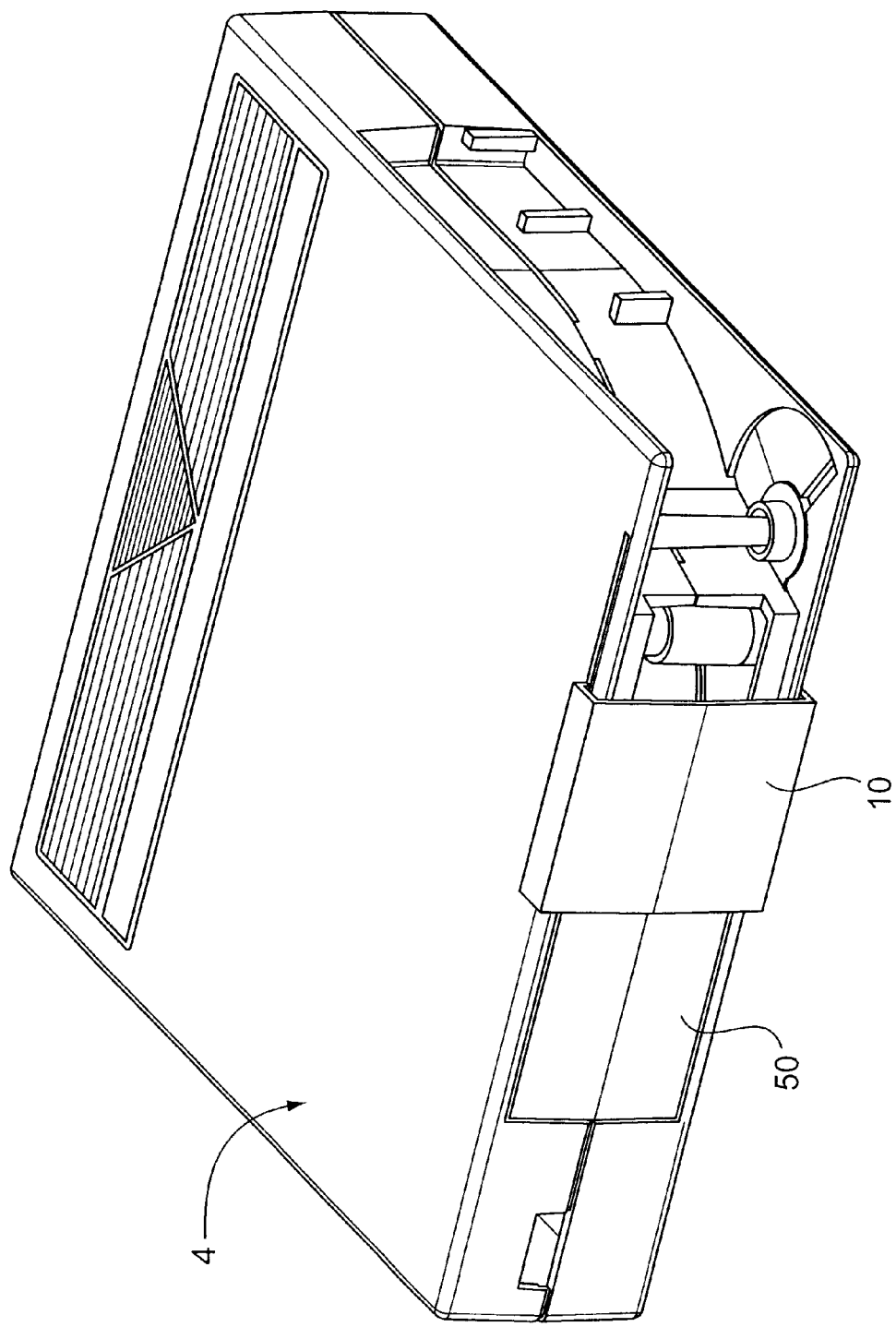
FIG. 2 illustrates a perspective view of an embodiment of the sliding door with auxiliary leader retractor with doors closed.
Figure 3:
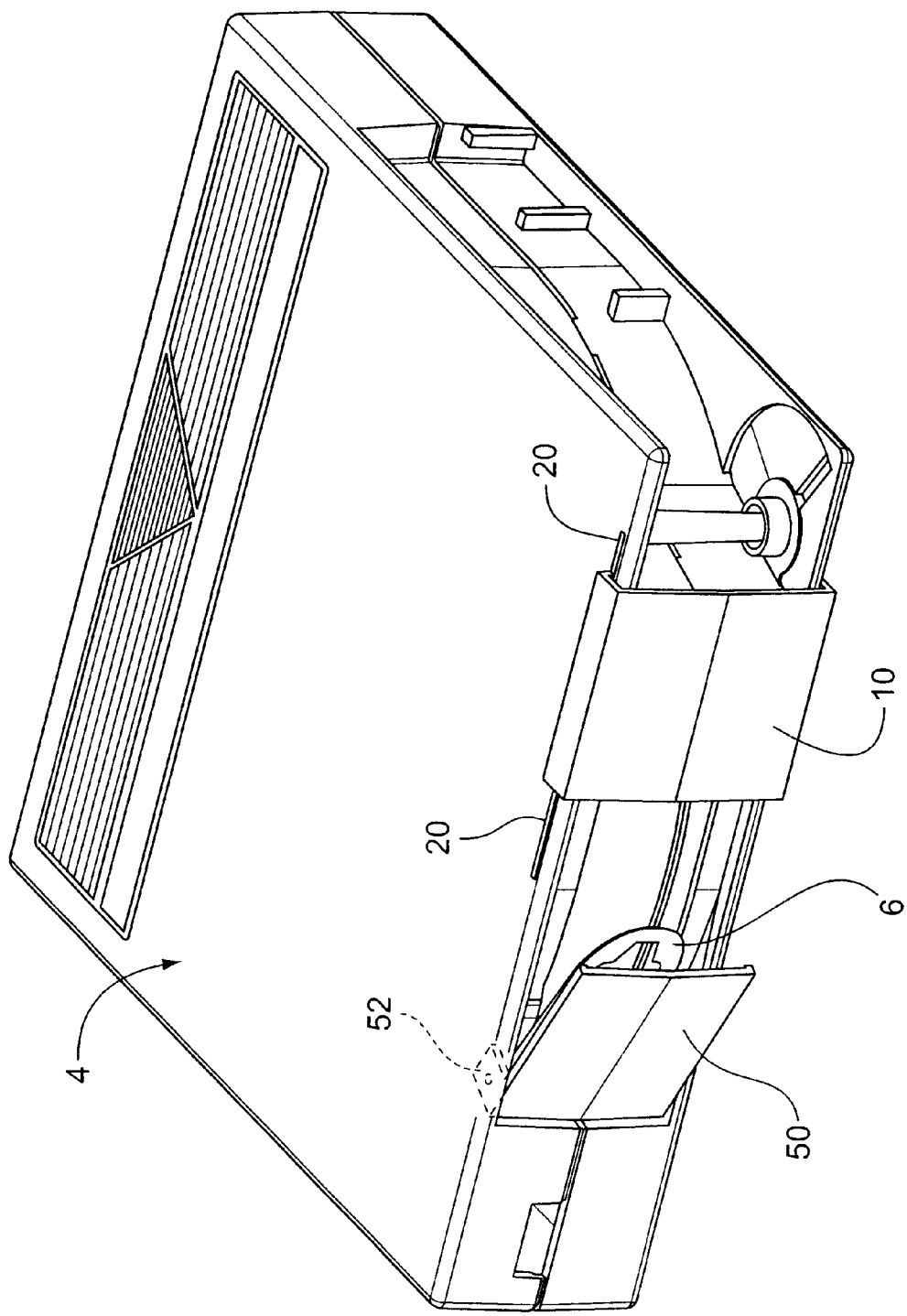
FIG. 3 illustrates a perspective view of an embodiment of the sliding door with auxiliary leader retractor with doors open.

Referring to FIGS. 2 and 3, sliding door 10 is located on the exterior surface of the tape cartridge 4 housing. Adjacent auxiliary leader retractor 50 is hinged internal to tape cartridge 4 housing. The sliding door assembly is shown in the closed position in FIG. 2 and in FIG. 3 with the auxiliary retracing door 50 in the partially open position, exposing leader tab 6. Tape cartridge 4 has a means for sliding (not shown) sliding door 10 located on the top and bottom exterior housing of tape cartridge 4 and sliding door 10 is slid horizontally on the sliding means to an open or closed position. While sliding means are apparent to those skilled in the art, the present sliding door assembly is described using tracks 20 as a sliding means. Tracks 20 can be molded into the plastic housing and can include stops, not shown, at either or both ends of the tracks to limit the travel of sliding door 10. In an embodiment, sliding door 10 can slide to entirely cover internally hinged auxiliary leader retractor 50 to prevent damaging the auxiliary leader retractor or from accidentally exposing leader tab 6. The sliding door assembly just described does not use valuable area within the tape cartridge for the door during use. Area required within the tape drive for exposing the leader tab for operation is minimized by providing a pivoting auxiliary leader retractor that is no longer then the leader tab it is protecting. Additionally, providing a sliding door that opens by sliding the sliding door to the right makes the present sliding door assembly compatible with existing tape drives. For ease of operation, an actuating means is used to automatically open and close auxiliary leader retractor 50 corresponding to opening and closing sliding door 10.

Figure 4:
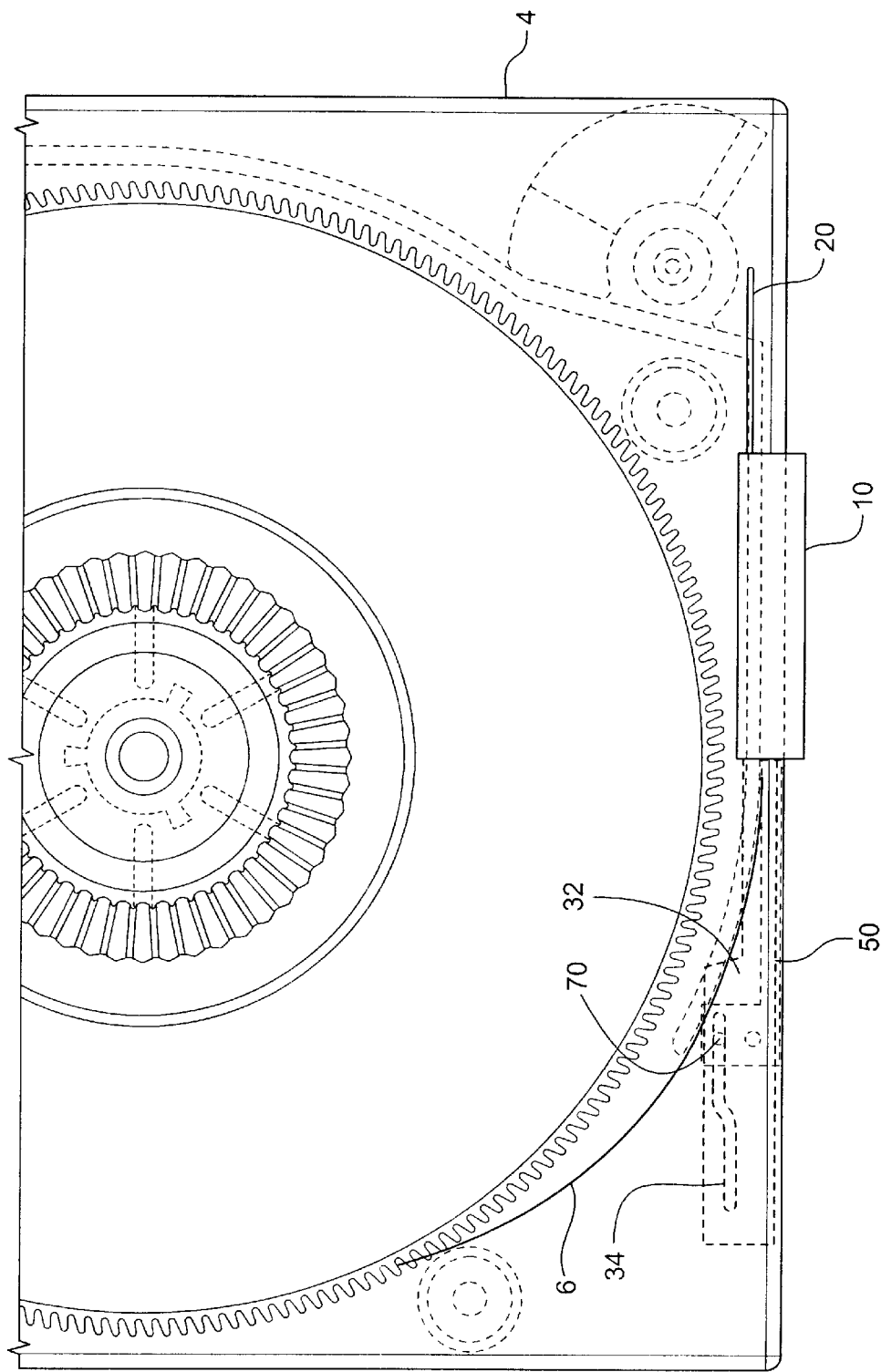
FIG. 4 illustrates a top view of an embodiment of the sliding door with auxiliary leader retractor with doors in the closed position.
Figure 5:
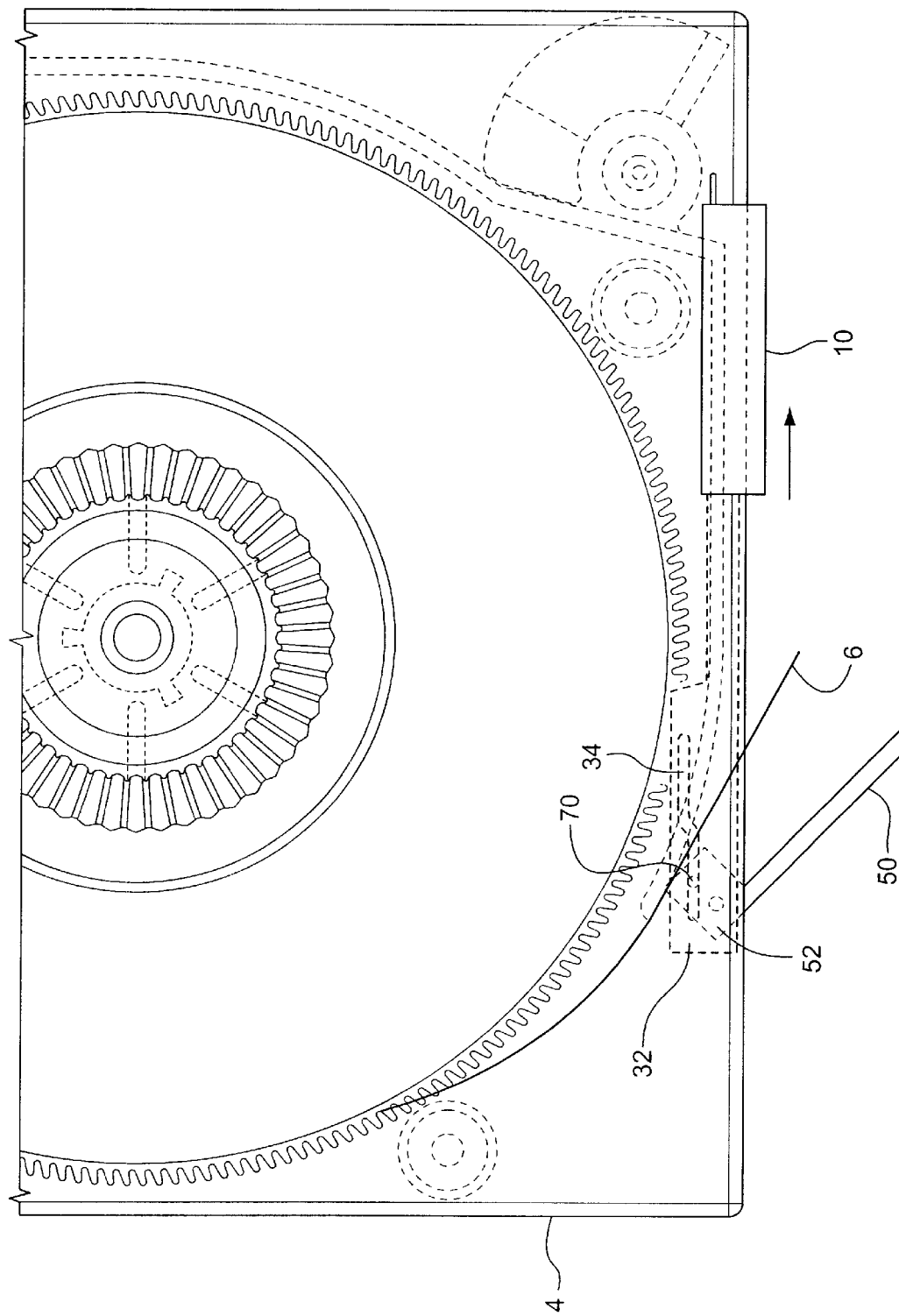
FIG. 5 illustrates a top view of an embodiment of the sliding door with auxiliary leader retractor with doors in the open position.

Cam Actuation—FIGS. 4–5

Referring to FIG. 4, in the top view of the cam actuation embodiment of the present sliding door assembly, the actuating means is cam 32 with an S-shaped profile 34. Cam 32 is integrally connected to sliding door 10 so that as sliding door 10 slides horizontally, cam 32 moves a corresponding distance in the same direction. While sliding door 10 slides on tracks 20 on the exterior surface of tape cartridge 4 housing, cam 32 slides internal to tape cartridge 4. The distance between cam 32 and the interior top surface of tape cartridge 4 is minimal and neither interferes with operation of the tape cartridge nor reduces the area available for tape media. Alternatively, cam 32 can be external to the tape cartridge housing and integrally connected to either the top or the bottom of the sliding door, or both. In this alternative embodiment (not illustrated) auxiliary leader retractor is hinged external to the tape cartridge 4 housing for interconnecting with the cam.

Referring to FIG. 5, auxiliary leader retractor 50 includes a small perpendicular flange 52 on the top and the bottom of one end. Flanges 52 include a means for pivoting 56 about a pivot point. Pivoting means may be holes in flanges 52 for receiving pegs protruding from the top and bottom of tape cartridge 4 housing pivot point thereby forming a hinge. Conversely, the pivoting means may be holes at the pivot point in the top and bottom of tape cartridge 4 to receive pegs that protrude from flanges 52.

In this embodiment of the sliding door with auxiliary leader retractor, flange 52 on auxiliary leader retractor 50 also includes a means for interconnecting with the actuation means, cam 32 in this example, to auxiliary leader retractor 50. Interconnecting means 70 can be pegs similar to those previously described for auxiliary leader retractor 50 pivoting apparatus. In this example, the peg fits into the S-shaped profile 34 in cam 32. The peg is located on flange 52 such that as sliding door 10 slides, cam 32 moves correspondingly and the peg follows S-shaped profile 34 causing auxiliary leader retractor 50 to pivot open or closed corresponding to the direction of sliding door 10 movement.

As sliding door 10 slides horizontally right to the open position, cam 32 also slides to the right. As cam 32 is sliding, interconnecting means 70 follows the s-shaped profile 34 in cam 32. When interconnecting means 70 transitions through the elbow of s-shaped profile 34, the change in position of interconnection means 70 relative to profile 34 pivots auxiliary leader retractor 50 to a corresponding open position exposing leader tab 6 for operation. Likewise, as sliding door 10 is closed, cam 32 moves left and interconnection means 70 travels toward the left side of s-shaped profile 34 causing auxiliary leader retractor 50 to rotate to a closed position thereby retracting leader tab 6. While the cam actuation has been illustrated and described from a top view of tape cartridge 4, cam 32 could be located on the bottom of sliding door 10 or on both the top and bottom.

As to alternative embodiments, those skilled in the art will appreciate that the present sliding door with auxiliary leader retractor may be configured with alternative actuating means for automatically opening the auxiliary leader retractor when the sliding door is opened. In the embodiments just described, a sliding door that actuates an auxiliary leader retractor makes that tape cartridge compatible with existing tape drives. Single reel tape cartridges with the present sliding door assembly can also be used with a more compact disk drive.

It is apparent that there has been described, a sliding door assembly for a single reel magnetic tape cartridge, that fully satisfies the objects, aims, and advantages set forth above. While the sliding door assembly has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A sliding door assembly for a single reel tape cartridge that consists of a housing that encloses a single reel on which is wound a length of magnetic tape with a leader tab attached to an end of the magnetic tape, for use with a tape drive having a takeup reel and a leader load mechanism, wherein the leader load mechanism attaches the leader tab to a takeup leader connected to the takeup reel, comprising:

a means for enclosing the magnetic tape and the leader tab in the single reel tape cartridge, a means for sliding located on an exterior surface of the single reel tape cartridge housing, wherein the enclosing means slides on the sliding means between an open and a closed position, a means for retracting the leader tab into the single reel tape cartridge, wherein the retracting means is pivotally connected to the single reel tape cartridge housing and adjacent to the enclosing means, and a means for actuating connecting the enclosing means and the retracting means, wherein as the enclosing means slides to the open position the actuating means pivots the retracting means to a corresponding open position and as the enclosing means slides to the closed position, the actuating means pivots the retracting means to a corresponding closed position, retracting the leader tab.

2. The sliding door assembly of claim 1, wherein the retracting means is a pivoting door integrally connected with the single reel tape cartridge housing to retracts the leader tab when the pivoting door is in the closed position and making the leader tab available when the pivoting door is in the open position.

3. The sliding door assembly of claim 1, wherein the enclosing means is a sliding door that slides along the sliding means on the exterior tape cartridge housing.

4. The sliding door assembly of claim 1, wherein the actuating means comprises:

a cam connected with the enclosing means, the cam having a profile, a peg connected with the retracting means, wherein the peg interfaces with the cam profile such that as the enclosing means slides the cam slides a corresponding distance and the peg follows the profile of the cam, pivoting the retracting means to a corresponding one of the open and the closed position.

5. The sliding door assembly of claim 1, wherein the actuating means comprises:

a cam having a profile, the cam connected with the enclosing means, a means for interfacing, the interfacing means connected to the retracting means and interfacing with the profile of the cam, wherein the interfacing means follows the profile of the cam as the enclosing means slides, pivoting the retracting means to a position corresponding to the position of the enclosing means.

6. A sliding door assembly for a single reel tape cartridge that consists of a housing that encloses a single reel on which is wound a length of magnetic tape with a leader tab attached to an end of the magnetic tape, for use with a tape drive having a takeup reel and a leader load mechanism, wherein the leader load mechanism connects the leader tab to a takeup leader, the sliding door assembly comprising:

tracks on an exterior surface of the tape cartridge housing;

a sliding door that slides on the tracks, a pivoting door pivotally connected to the tape cartridge housing adjacent to the sliding door, an actuating means connected between the sliding door and the pivoting door, wherein as the sliding door slides along the tracks the actuating means causes the pivoting door to pivot to a corresponding position.

7. The sliding door assembly of claim 6, wherein the actuating means comprises:

a cam having a profile, the cam connected with the sliding door, and a means for interfacing connected with the pivoting door, the interfacing means interfacing with the profile of the cam, wherein as the sliding door slides on the tracks the cam moves a corresponding distance and the interfacing means follows the profile to pivot the pivoting door to a position corresponding to the position of the sliding door.

8. A method for retracting/exposing a leader tab of a single reel tape cartridge, the tape cartridge having tracks on an exterior surface of the tape cartridge housing, a sliding door that slides on the tracks, a pivoting door adjacent to the sliding door and an actuating means interconnecting the sliding door and the pivoting door, the method comprising:

sliding the sliding door along the tracks between an open and a closed position, substantially simultaneously, actuating the actuating means, and the actuating means, pivoting the pivoting door to a position corresponding to the position of the sliding door to expose/retract the leader tab respectively.

* * * * *